US006230977B1

(12) United States Patent
Johnson

(10) Patent No.: US 6,230,977 B1
(45) Date of Patent: May 15, 2001

(54) APPARATUS FOR PROCESSING WARPED, BOWED AND BENT CREDIT CARDS

(75) Inventor: James Johnson, Lake Forest, CA (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 0 days.

(21) Appl. No.: 09/272,661

(22) Filed: Mar. 18, 1999

(51) Int. Cl.[7] ...................................................... G06K 5/00

(52) U.S. Cl. ............................................ 235/475; 235/380

(58) Field of Search .................................... 235/483, 485, 235/380, 449, 379, 475

(56) References Cited

U.S. PATENT DOCUMENTS 5,589,681 * 12/1996 Merlin et al. ........................ 235/482
6,070,802 * 6/2000 Yi ........................................ 235/475

* cited by examiner

*Primary Examiner*—Mark Tremblay
(74) *Attorney, Agent, or Firm*—Salzman & Levy

(57) ABSTRACT

A credit or smart card reader for processing bent, bowed, or warped credit or smart cards. A standard reader has an insertion slot for inserting a card to be read and processed. A normal, undamaged card is inserted into a slot provided in the insertion slot. The normal card travels along a processing path contacting a supporting card ramp. A bent, bowed, or warped credit or smart card, however, misses the supporting card ramp and is confiscated. A deflection guide in accordance with this invention is provided for redirecting the deformed card into the processing path.

12 Claims, 2 Drawing Sheets

26
24
17
11a
22
16

APPARATUS FOR PROCESSING WARPED, BOWED AND BENT CREDIT CARDS

RELATED PATENT APPLICATION

The present patent application is related to copending U.S. patent application, Ser. No. 09/272,726, filed concurrently herewith for CREDIT CARD READER ENCLOSURE WITH DEBRIS OPENING.

FIELD OF THE INVENTION

The present invention relates to credit card and smart card readers and, more particularly, to apparatus for processing warped, bowed, or bent credit and smart cards.

BACKGROUND OF THE INVENTION

Warped credit and smart cards are a ubiquitous phenomena. Cards tend to deform and warp easily when carried in back-pocket wallets, for example. Therefore, the reading of bent, bowed, or warped credit and smart cards can be a frequent problem for a card reader. This is because the warped card does not follow the processing path within the reader. The leading edge of a warped card passes through the insert slot without being captured. Therefore, when the trailing edge passes the insert station, no support is provided for the card. Since the leading edge of a warped card normally passes through an insertion slot to contact a card ramp, bowed or warped credit cards miss this card ramp.

The present invention provides a means by which bowed or warped credit cards can be processed within a card reader. The invention features a deflector disposed adjacent the card ramp of a reader assembly. The card ramp is positioned opposite the insertion slot. The inventive deflector has a curved or angled surface, upon which the credit card impinges, the card being redirected into the processing path. Typically, the card is manually inserted and withdrawn. However, an automated system can also be used to accomplish this task.

SUMMARY OF THE INVENTION

In accordance with the present invention, there is provided a credit or smart card reader for processing bent, bowed, or warped credit or smart cards. A standard reader comprises an insertion slot for inserting a card to be read and processed. A normal, undamaged card is inserted into a slot provided in the insertion slot. The normal card travels along a processing path contacting a supporting card ramp. Once fully inserted, the normal card is processed in the usual manner.

In the case of a warped, bowed, or bent card, the leading edge of the card passes through the insert slot without contacting the card ramp. Therefore, when the trailing edge passes the insert station, no stop is provided for the card. The card will be confiscated without being processed. This is not desirable, owing to the fact that a great number of cards become deformed when carried in a back-pocket wallet. This results, unfortunately, in certain valid cards being unintentionally confiscated by the reader.

In order to prevent this, the present invention provides a deflection guide disposed along the processing path adjacent the card ramp. The deflection guide comprises a curved or angled surface. The leading edge of a warped or bowed card impinges upon the deflection guide, after being inserted into the insert slot on the insertion slot. The curved or angled surface of the guide forces the leading edge of the card into the processing path, where it comes to stop in the processing path.

It is an object of the present invention to provide an improved credit or smart card reader.

It is another object of this invention to provide a credit or smart card reader that can process bent, bowed, or warped credit cards.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same numbering and designation throughout the figures.

DESCRIPTION OF THE PREFERRED EMBODIMENT

Generally speaking, the invention features a card reader apparatus for processing bent, bowed, or warped credit or smart cards. A deflection guide is provided within the card reader for receiving the leading edge of a warped card and redirecting the card into the processing path.

Figure 2:
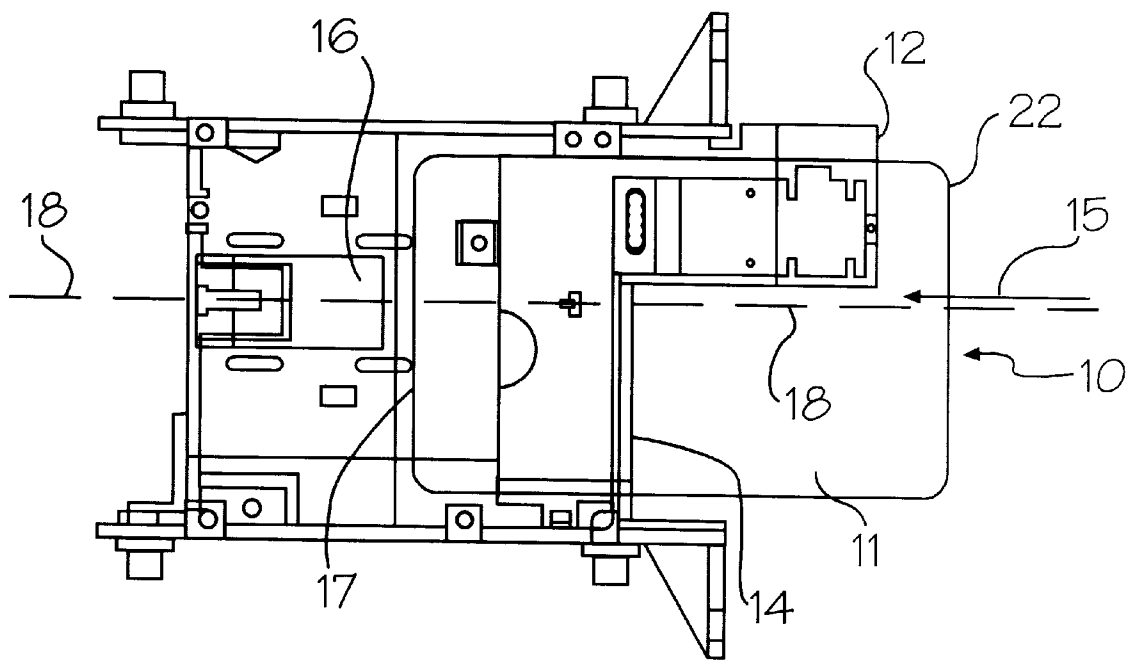
FIG. 2 depicts a top view of the insertion slot and card ramp for a card reader apparatus, and an in situ view of a normal credit card being introduced into the card reader.
Figure 3:
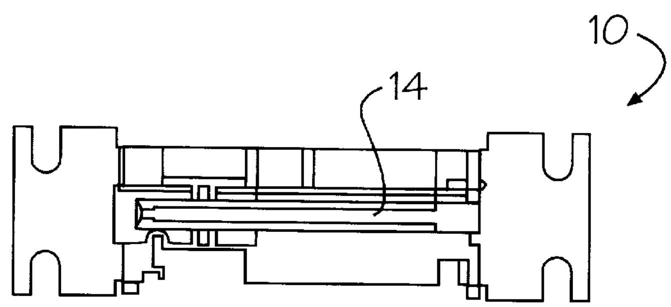
FIG. 3 shows a front view of the insertion slot depicted in FIG. 2.

Now referring to FIG. 2, a top view of the insertion slot 12 of a card reader device 10, is illustrated. A credit card 11 is shown being inserted (arrow 15) into the insertion slot 14 of the insertion slot 12, as best observed with reference to FIG. 3. The leading edge 17 of a straight, unbowed card 11 is able to reach the card ramp 16, thus allowing the card 11 to be supported, as it travels along the processing path, shown by dotted line 18.

Figure 4:
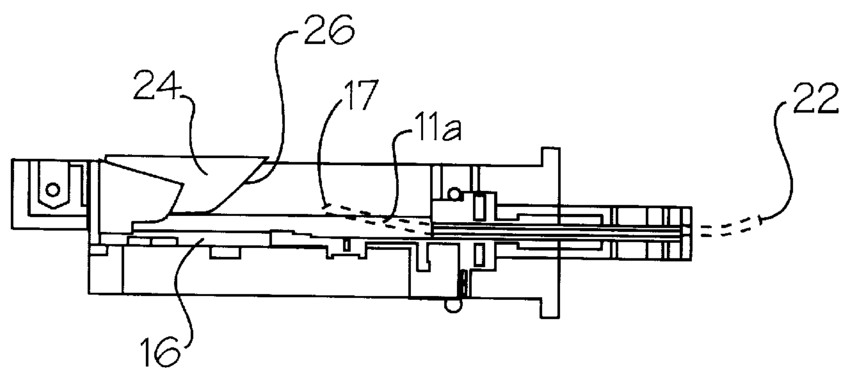
FIG. 4 illustrates a side view of the card guide disposed within the card reader with a bent card shown in phantom view.
Figure 5:
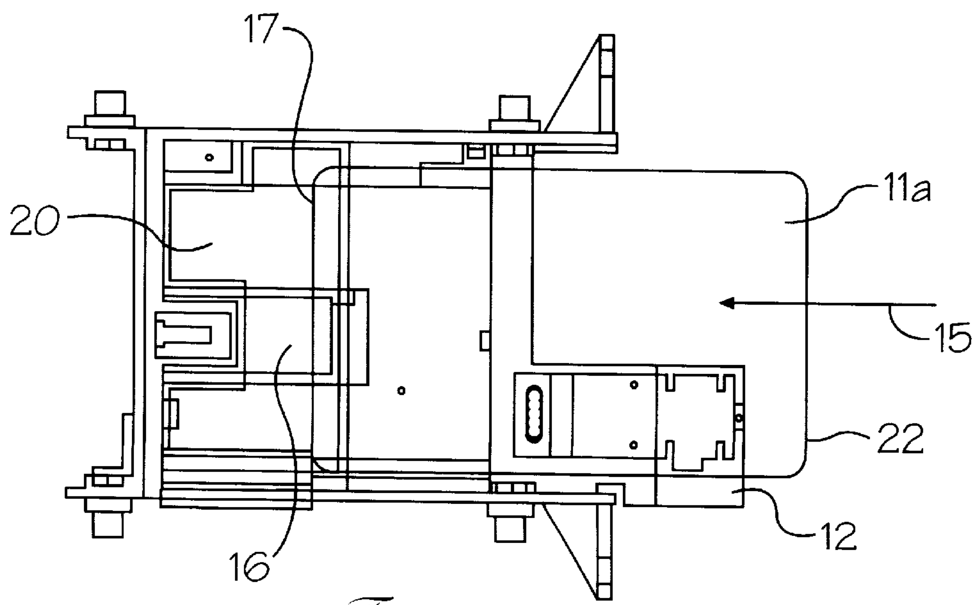
FIG. 5 shows a bottom view of the card reader apparatus illustrated in FIGS. 2 through 4.

Referring to FIG. 5, a bowed card 11*a* (best shown in FIG. 4 in dotted line) is inserted (arrow 15) into the card reader 10, but does not contact the card ramp 16. The leading edge 17 of the card 11*a*, not being able to contact card ramp 16, is confiscated, when the trailing edge 22 passes through the insertion slot 14, owing to the fact that bowed card 11*a* has no support at either edge 17 or 22, respectively.

Figure 1:
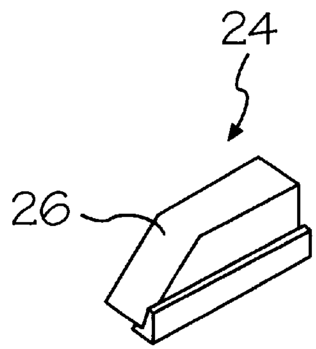
FIG. 1 illustrates a perspective view of the card guide of this invention.

Referring to FIGS. 1 and 4, a deflection guide 24 in accordance with this invention is shown having a curved or angled surface 26. The deflection guide 24 is disposed above the card ramp 16. Generally, only one deflection guide 24 is needed; however, multiple deflection guides 24 can be incorporated into a reader. The leading edge 17 of the bowed card 11*a* is caused to contact the curved or angled surface 26 of the deflector guide 24, as it is inserted into the card reader 10. The curved or angled surface 26 is impinged by the leading edge 17 of the bowed card 11*a*, causing the card to deflect into the processing path 18. Thus, the card reader 10 now has the capability of processing bent, bowed, or warped cards 11*a*.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A credit or smart card reader for reading and processing bent, bowed, or warped credit or smart cards, comprising:

means defining a processing path upon which a credit or smart card is caused to travel;

an insertion slot disposed along said processing path for inserting said card to be read and processed by the card reader;

a spring loaded card guide disposed along said processing path for holding a card for reading and processing; and a pair of deflection guides disposed along the processing path juxtaposed to said insertion slot for receiving a bent, bowed, or warped credit or smart card, a respective one of said pair of deflection guides forcing a leading edge of a card into said processing path, whereby said card is held for reading and processing.

2. The credit or smart card reader for reading and processing bent, bowed, or warped credit or smart cards in accordance with claim 1, wherein each of said pair of deflection guides respectively comprises an angled surface for deflecting a leading edge of an impinging credit or smart card.

3. The credit or smart card reader for reading and processing bent, bowed, or warped credit or smart cards in accordance with claim 1, wherein each of said pair of deflection guides respectively comprises a curved surface for deflecting a leading edge of an impinging credit or smart card.

4. The credit or smart card reader for reading and processing bent, bowed, or warped credit or smart cards in accordance with claim 1, further comprising a card ramp for supporting a card within said credit or smart card reader.

5. A credit or smart card reader for reading and processing credit or smart cards, comprising:

means defining a processing path upon which a credit or smart card is caused to travel;

an insertion slot disposed along said processing path for inserting said card to be read and processed by said credit or smart card reader;

holding means disposed along said processing path for holding a card for reading and processing; and a pair of deflection guides disposed above and below said processing path opposite said insertion slot, each deflection guide for respectively receiving a deformed credit or smart card, said deflection guides each respectively forcing a card into said processing path, whereby said card is held for reading and processing.

6. The credit or smart card reader for reading and processing credit or smart cards in accordance with claim 5, wherein said pair of deflection guides each comprises an angled surface for deflecting a leading edge of an impinging credit or smart card.

7. The credit or smart card reader for reading and processing credit or smart cards in accordance with claim 5, wherein said pair of deflection guides each comprises a curved surface for deflecting a leading edge of an impinging credit or smart card.

8. The credit or smart card reader for reading and processing credit or smart cards in accordance with claim 5, further comprising a card ramp for supporting a credit or smart card within said credit or smart card reader.

9. A credit or smart card reader for reading and processing credit or smart cards comprising:

means defining a processing path upon which a credit or smart card is caused to travel;

insertion means disposed along said processing path for inserting said card to be read and processed by said credit or smart card reader;

holding means disposed along said processing path for holding a card for reading and processing; and a pair of deflection guides disposed along said processing path opposite said insertion means for receiving a deformed credit or smart card, each deflection guide respectively forcing a card into said processing path, whereby said card is held by said holding means for reading and processing.

10. The credit or smart card reader for reading and processing credit or smart cards in accordance with claim 9, wherein said deflection guides each comprises an angled surface for deflecting a leading edge of an impinging credit or smart card.

11. The credit or smart card reader for reading and processing credit or smart cards in accordance with claim 9, wherein said deflection guides each comprises a curved surface for deflecting a leading edge of an impinging credit or smart card.

12. The credit or smart card reader for reading and processing credit or smart cards in accordance with claim 9, further comprising a card ramp for supporting a card within said credit or smart card reader.

* * * * *